April 25, 1961     E. O. SCHONSTEDT     2,981,885
SATURABLE MEASURING DEVICE AND MAGNETIC CORE THEREFOR
Filed July 21, 1958     3 Sheets-Sheet 1
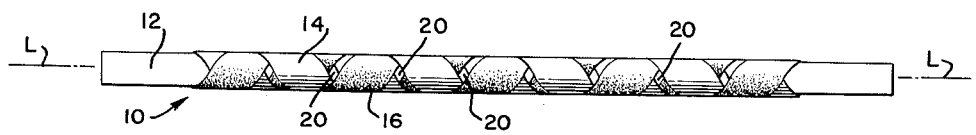
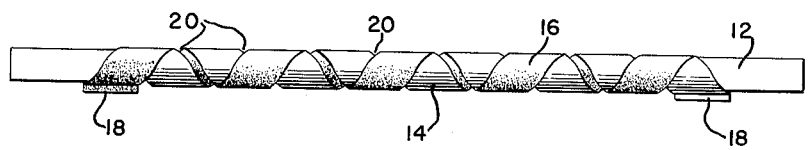
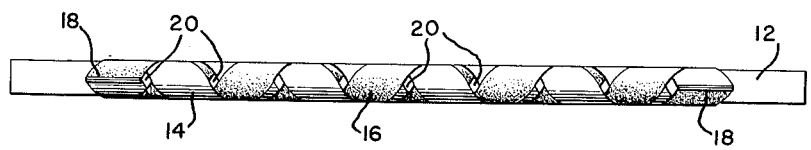
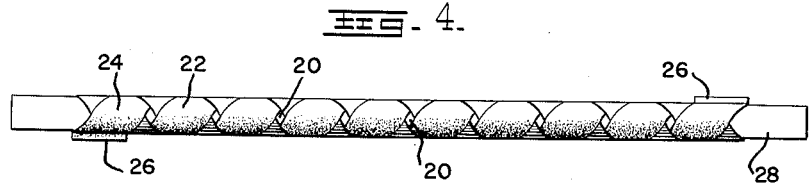
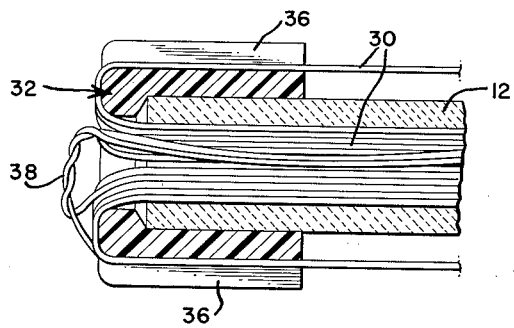
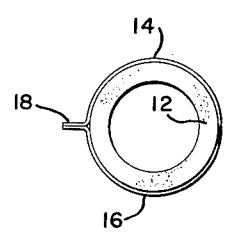
INVENTOR.
ERICK O. SCHONSTEDT
ATTORNEY April 25, 1961 E. O. SCHONSTEDT 2,981,885
SATURABLE MEASURING DEVICE AND MAGNETIC CORE THEREFOR
Filed July 21, 1958 3 Sheets-Sheet 2
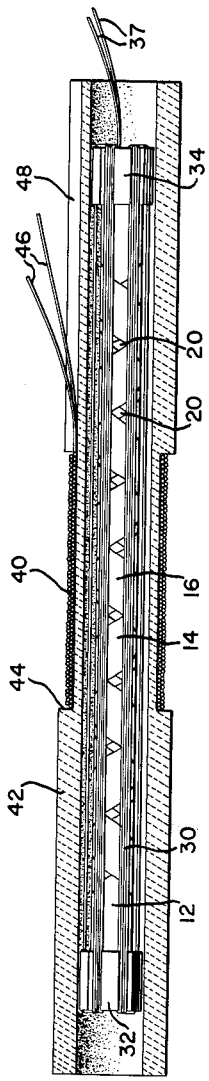
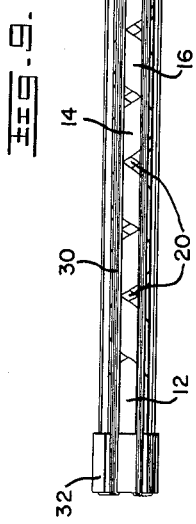
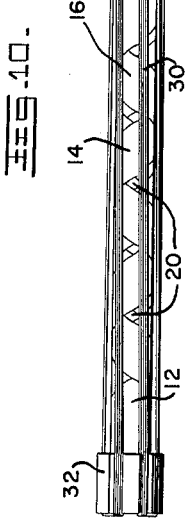
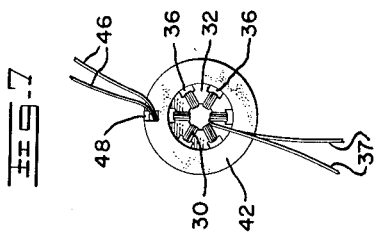
INVENTOR.
ERICK O. SCHONSTEDT
BY
ATTORNEY April 25, 1961 E. O. SCHONSTEDT 2,981,885
SATURABLE MEASURING DEVICE AND MAGNETIC CORE THEREFOR
Filed July 21, 1958 3 Sheets-Sheet 3
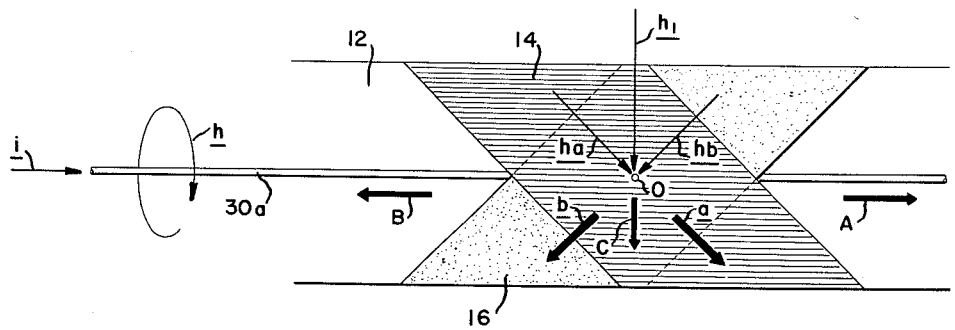
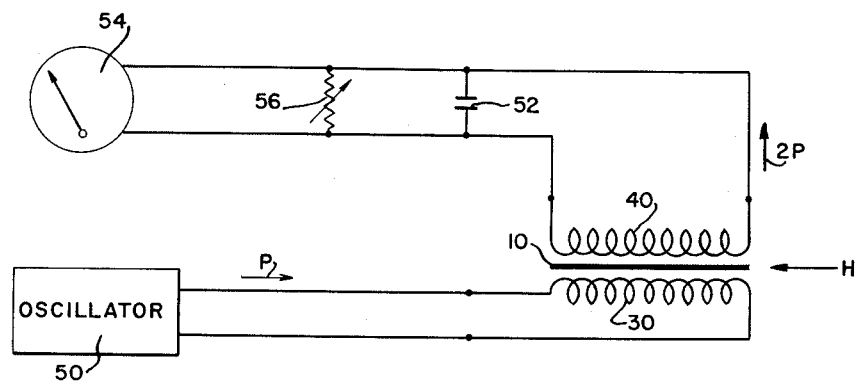
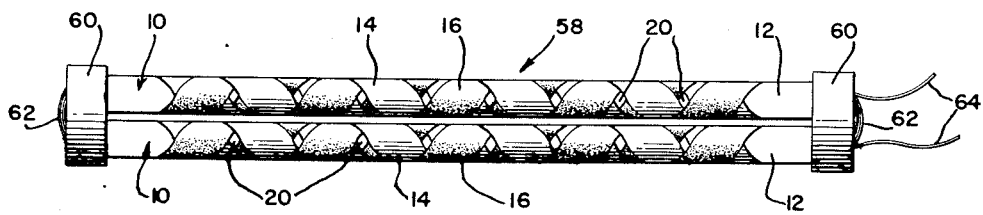
INVENTOR.
ERICK O. SCHONSTEDT
BY
ATTORNEY United States Patent Office 2,981,885
Patented Apr. 25, 1961

2,981,885

SATURABLE MEASURING DEVICE AND MAGNETIC CORE THEREFOR

Erick O. Schonstedt, 927 Pershing Drive,
Silver Spring Md.

Filed July 21, 1958, Ser. No. 749,953

5 Claims. (Cl. 324—43)

The present invention relates to magnetic measuring devices and to improved magnetic cores which may be used in such devices, but not exclusively. More particularly, the invention has application to the field of magnetometers and flux responsive measuring devices.

Magnetometers of the prior art that employ saturable magnetic cores and that have essentially zero coupling between their excitation and signal pick-up windings are usually of two general types. In one type, two parallel axis magnetic strips or wires form cores which are employed in conjunction with means for cyclically magnetizing the cores into saturation in opposite directions at some fundamental frequency. The flux emanating from one strip or wire is cancelled by the flux emanating from the other strip or wire. Hence, there is essentially zero flux at the fundamental frequency cutting the signal pick-up winding, which normally surrounds the strips. An applied static field, such as that of the earth, magnetizes both cores in the same direction, resulting in second harmonic flux that cuts the pick-up winding and thereby generates voltages therein at the second harmonic of the fundamental frequency. To effect a high degree of cancellation of the individual fluxes of the two cores, the cores must be matched to a reasonably high degree of accuracy. If the excitation current has second harmonic frequency components, spurious signal voltages at this frequency will be generated in the pick-up winding, unless the strips are accurately matched.

The second type of magnetometer employs a permeable magnetic tube as the core element. The windings through which the excitation current is passed are formed in a toroidal manner about the core, and the magnetic field associated with the excitation current cyclically magnetizes the core into saturation in an annular direction about the axis of the tube. Because of the annular disposition of the excitation flux, no flux is generated parallel to the axis of the core, so no flux of fundamental frequency cuts the pick-up coil which is normally wound co-axially about the core. Thus, the excitation current may contain a small amount of second harmonic frequency without serious effect. A magnetic field parallel to the axis of the core produces a flux that is cyclically modified by the excitation flux such that a flux at second harmonic frequency is generated parallel with the axis of the core. This flux cuts the pick-up winding to generate second harmonic voltages therein.

The latter form of magnetic field sensing device has the advantage of low excitation power requirements, since the path of the excitation flux is endless. It also has the advantage, as mentioned above, of being less sensitive to second harmonic components in the excitation flux. However, because of the fact that the excitation flux is directed perpendicularly to the flux produced by the magnetic field to be measured, there is no "shaking" flux parallel to the axis of the core, and the core tends to become permanently magnetized along its length. Because of this permanent magnetization, second harmonic signals are generated even in the absence of an axial magnetic field, and the device is thus subject to inaccuracy.

The present invention has the advantages of both of the foregoing types of magnetic field sensing devices but eliminates or minimizes the objectionable features of both. It is accordingly a primary object of the invention to provide such a device.

A further object of the invention is to provide an improved means for measuring the intensity of weak magnetic fields, such as that of the earth, or for measuring currents by virtue of the magnetic fields produced.

Another object of the invention is to provide unique and improved magnetic cores.

A further object of the invention is to provide improved magnetic cores of unusually compact and lightweight construction.

An additional object of the invention is to provide magnetic cores which may be easily adjusted to optimum conditions of operation.

Yet another object of the invention is to provide unique and improved core and winding assemblies.

A further object of the invention is to provide core and winding assemblies that are readily adjustable to optimum operating conditions.

Still another object of the invention is to provide a magnetic core which is not subject to permanent magnetization and yet when employed in a magnetometer or the like produces a higher power output than comparable devices.

The foregoing and other objects, features, and advantages of the invention, and the exact manner in which the same are accomplished will become more readily apparent upon consideration of the following detailed description of the invention taken in conjunction with the accompanying drawings, which illustrate preferred and exemplary embodiments, and wherein:

Figure 1 is a top plan view of a preferred core embodiment of the invention;

Figure 2 is a side elevation view of the core of Figure 1;

Figure 3 is a bottom plan view of the same core;

Figure 4 is a side elevation view of a modified form of core;

Figure 5 is an enlarged longitudinal sectional view of a detail of the invention;

Figure 6 is an enlarged end view of the core of Figures 1 through 3, and is applicable to Figure 4 as well;

Figure 7 is an end view of a coil and core assembly of the invention;

Figure 8 is a longitudinal sectional view of the assembly of Figure 7;

Figure 9 is a plan view of a sub-assembly of Figure 8;

Figure 10 is a similar plan view illustrating adjustment of the assembly;

Figure 11 is an explanatory diagram;

Figure 12 is a schematic diagram illustrating the manner in which the invention is employed in measuring a magnetic field; and Figure 13 is a plan view of a modified form of core and coil assembly.

Briefly stated, an exemplary form of the invention comprises a non-magnetic hollow cylindrical form on which interwoven helical strips of permeable magnetic material are oppositely wound. The core thus formed may be coupled to an excitation winding and a signal pick-up winding, which are wound on suitable supports and forms in such a manner that the windings are substantially de-coupled from each other. As will appear more fully hereinafter, both the core and the windings are adjustable.

Referring now to the drawings, and initially to Figures 1 through 3 thereof, a preferred form of core 10 constructed in accordance with the principles of the invention comprises a tube 12 of some highly refractory ceramic material on which are wound two superposed interwoven thin strips 14 and 16 of a permeable magnetic material, such as "Permalloy." The strips, which are differentiated in the drawing by shading and stippling, respectively, are helically wound about the tube 12 in opposite directions, such that one strip has a right hand helix angle and the other has a left hand helix angle. In the form shown each strip passes under the other twice and then over the other twice. The strips are preferably so wound that small diamond shaped metal-free spaces 20 are formed, one for each half convolution of the two strips. The strips thus broadly define a hollow metal cylinder or tube with a series of holes. The corresponding adjacent ends 18 of the strips are joined, as by crimping, spot welding, or by some other means. After the strips are wound on the ceramic tube, the assembled parts are suitably heat treated in an atmosphere of dry hydrogen to obtain the desired highly permeable magnetic properties of the strips.

The interwoven construction of the cores places each of the strips at the same average distance from the longitudinal axis of the cores and, as will become apparent, ensures that each strip is excited by substantially the same amount of magnetic flux. The interwoven construction is slightly extensible, so that stresses in the strips, due to differential thermal expansion of the tube and the interwoven strips, do not become serious.

For the most satisfactory performance when the cores are used in highly refined measuring instruments, the cores are formed by interweaving the strips in such a manner that substantially the same amounts of strip 14 and strip 16 are exposed when the core is viewed in any direction perpendicular to the longitudinal axis L of the core. Unequal exposure may result in the generation of second harmonic fluxes which are out of phase with the signal fluxes, when there is a component of field perpendicular to the longitudinal axis of the core. The "under two, over two" winding arrangement of Figures 1 through 3 readily produces the aforesaid equal exposure of the two strips.

Figure 4 illustrates a different embodiment, which has unequal exposure in different directions perpendicular to the longitudinal axis of the core and which is useful for special applications. In this form of the invention two strips 22 and 24 have their corresponding ends joined as indicated at 26 and are wound oppositely about a ceramic tube 28 in such a manner that each strip passes under the other once and then over the other once. As shown, strip 22 is predominantly exposed in the viewing direction of Figure 4, strip 24 being predominantly exposed if the viewing direction is shifted 180 degrees.

Although two strips have been shown and described in the foregoing embodiments, within the broader aspects of the invention the core may be comprised of a greater number of interwoven strips or of wires.

In adapting the cores of the invention for magnetometer use, a toroidal excitation winding 30 may be wound about the core as shown in Figure 9. This winding may be made of insulated copper wire and an electrical current in the wire produces an annular flux about the axis of the core. It is preferably supported on the core by a pair of slotted plastic ferrules or sleeves 32 and 34 which fit over the ends of the tube 12 as shown in Figure 5. The longitudinal circumferentially spaced slots 36 (see Figs. 5 and 7) receive the turns of the excitation winding 30, which pass over the exterior of the core and are threaded through the core as shown in Figure 5. Each slot 36 may receive five turns, for example, and the turns may be wound one after another in one slot, then wound successively in the next slot, and so on. The ends 37 of the winding are preferably twisted together at one end of tube 12, as shown at 38 in Figure 5, and then threaded through the tube and pulled out of the opposite end, as shown in Figure 9. This ensures that the winding will not loosen.

The ferrules 32 and 34 have central openings for passage of the turns of the excitation winding and are internally enlarged to receive the corresponding ends of the tube 12 as shown. The ferrules serve to hold the excitation winding in place and to prevent contact between the winding and the magnetic strips 14 and 16. Occasionally, due to manufacturing tolerances or widely different magnetic characteristics of strips 14 and 16, objectionable amounts of net fundamental frequency flux may be generated parallel to the longitudinal axis of the core. This flux can be minimized by twisting the turns of the excitation winding 30 in the proper direction, as by turning one of the ferrules relative to the other about the axis of the core. The excitation winding then has a slight helical lay as shown in Figure 10. The result of this adjustment, which is permitted by making at least one of the ferrules movable on the supporting tube 12, is that one strip will receive more excitation flux than the other, thereby tending to reduce the net amount of fundamental flux parallel to the axis of the core.

A pick-up winding 40 may be assembled with the foregoing coil and core assembly as shown in Figure 8. In this embodiment the assembly of coil 30 and core 10 is inserted in a plastic tube 42, which may receive the assembly fairly snugly. The coil 40 may comprise numerous turns of insulated copper wire wound in one or more helical layers about the axis of tube 42, preferably in an annular recess 44. The ends 46 of the winding 40 may pass through a longitudinal slot 48 formed in the surface of tube 42.

The relationship between the excitation flux and the flux generated in strips 14 and 16 is shown diagrammatically in Figure 11. In this figure a small portion of strip 14 is shown overlying a small portion of strip 16. For simplicity the excitation current $i$ is illustrated as being carried by a single conductor 30a. The instantaneous direction of the magnetic field associated with the current $i$ is illustrated by the circular arrow $h$. At the point O common to strips 14 and 16, the instantaneous magnetic field associated with the current $i$ is represented by the vector arrow $hl$. This vector can be resolved into a component $ha$ parallel to strip 14 and a component $hb$ parallel to strip 16. Component $ha$ produces a flux represented by arrow $a$ parallel to strip 14, and component $hb$ produces a flux $b$ represented by arrow $b$ parallel to the strip 16. Flux $a$ within strip 14 follows the helical path of this strip about the longitudinal axis of the core. The component of this flux parallel with the said axis is represented by arrow A. Similarly, flux $b$ follows the helical path formed by strip 16 and has a component parallel with the longitudinal axis of the core represented by arrow B. If fluxes A and B are equal, there will be no net flux parallel with the axis of the core. If current $i$ reverses, the direction of all of the arrows will reverse, thus producing oppositely directed fluxes along strips 14 and 16, but with the same cancellation. Due to the tubular structure formed by the strips 14 and 16, however, some annular flux will be produced by the field $hl$. This flux is represented by arrow C.

The various fluxes represented by arrows A, B, and C, may be employed to produce magnetometer action. Fluxes A and B have the character of two straight permeable strips excited in opposite directions, while flux C has the character of a core formed by a uniform permeable tube. The ration of the two general types of fluxes, that is, longitudinal and annular, can be regulated to some extent by varying the size of the diamond shaped space 20. This may be accomplished during the winding of the core, or afterward by shifting the core turns slightly.

The flux produced by a magnetic field, such as that of the earth, will follow to a large extent the helical paths formed by the strips 14 and 16. Some flux will be produced parallel to the axis of the core. However, in either case, the flux due to the earth's field will be "shaken" or cyclically reversed by an alternating flux produced by the excitation coil along the helical paths of the strips 14 and 16.

Figure 12 is a schematic diagram of a simple circuit in which the invention may be so employed. In this figure the oscillator 50 produces an alternating current of frequency P, the current being passed through the excitation winding 30 to drive the core 10 cyclically into saturation, the core being represented diagrammatically by the heavy line. Second harmonic fluxes at frequency 2P, generated in the core due to the effect of an external magnetic field H acting along the axis of the core, cut the pick-up winding 40 and generate voltages at frequency 2P therein. In the diagrammatic showing, windings 30 and 40 appear to be coupled, but in fact, they are wound as shown in Figure 8 so as to be de-coupled.

A capacitor 52 is connected across the pick-up winding 40 and is employed to tune the pick-up winding to the second harmonic frequency. The magnitude of the voltage of the second harmonic generated in the pick-up winding is measured by means of an A.C. voltmeter 54 connected across the pick-up winding. A variable resistor shunt 56 may be employed to vary the voltage sensitivity of the circuit.

The circuit of Figure 12 is merely representative of a simple circuit which may be employed as a building block in more complex systems for measuring magnetic fields or for measuring currents by virtue of the accompanying magnetic fields. For example, three such circuits might be employed to determine the magnetic field components along mutually perpendicular coordinates.

Figure 13 illustrates a modified form of coil and core assembly. In this form of the invention the core 58 comprises a pair of the cores 10 of Figures 1 through 3. The two cores 10 are arranged with their axes parallel and their ends supported in insulating discs 60. The excitation winding 62 may have its turns wound continuously through the hollow cylinders of cores 10 in sequence, the ends 64 of the winding being brought out of the respective core elements as shown. This core and coil assembly may be inserted in a tube, such as the tube 42 shown in Figure 8, and surrounded by a pick-up winding, such as the winding 40 previously described. The advantage of this arrangement is that increased power output is obtained without increasing the thickness of the permalloy stripes and without lengthening the core, which might enable the core to become saturated by a field as weak as the earth's magnetic field.

From the foregoing description of the invention, it will be apparent that unique magnetic measuring devices, magnetic cores, and core and coil assemblies are provided. While preferred forms of the invention have been shown and described, it will be appreciated by those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. A magnetic core and winding assembly comprising a non-magnetic hollow cylindrical form, a pair of superposed oppositely wound coaxial coils of permeable magnetic material interwoven on the outside of said form, winding support means mounted on the outside of said cylinder for spacing turns of wire from said coils, and a plurality of turns of wire wrapped over said winding support means and threaded through said form.

2. The invention of claim 1, said winding support means comprising a pair of sleeves receiving the ends of said form and having grooves to hold said winding turns.

3. The invention of claim 2, at least one of said sleeves being circumferentially movable on said form to vary the angle of said turns with respect to the axis of said form.

4. The invention of claim 1, further comprising a second non-magnetic form surrounding said winding, said second form supporting an additional winding with turns of the additional winding substantially perpendicular to the turns of the first-mentioned winding.

5. A magnetic core and winding assembly comprising a non-magnetic hollow cylindrical form, at least two superposed oppositely wound coaxial coils of permeable magnetic material interwoven on the outside of said form, winding support means mounted on the outside of said cylinder for spacing turns of wire from said coils, and a plurality of turns of wire wrapped over said winding support means and threaded through said form.

References Cited in the file of this patent

UNITED STATES PATENTS

| | | |
|---|---|---|
| 499,852 | Pfannkuche | June 20, 1893 |
| 1,083,258 | Kitsee | Dec. 30, 1913 |
| 2,277,474 | Bergtold | Mar. 24, 1942 |
| 2,386,753 | Shield | Oct. 16, 1945 |
| 2,432,514 | Depp et al. | Dec. 16, 1947 |
| 2,438,146 | Candee et al. | Mar. 23, 1948 |
| 2,856,581 | Alldredge | Oct. 14, 1958 |
| 2,872,653 | Wiegand | Feb. 3, 1959 |
| 2,890,426 | McElwain | June 9, 1959 |

FOREIGN PATENTS

| | | |
|---|---|---|
| 592,241 | Great Britain | Sept. 11, 1947 |